United States Patent [19]

De Boer

[11] Patent Number: 5,412,279
[45] Date of Patent: May 2, 1995

[54] ANTISTATIC COATING FOR, IN PARTICULAR, A CATHODE RAY TUBE COMPRISING LATEX PARTICLES OF A POLYPYROLE COMPOUND IN A SILICON DIOXIDE MATRIX

[75] Inventor: Johannes De Boer, Venlo, Netherlands

[73] Assignee: U.S. Philips Corporation, New York, N.Y.

[21] Appl. No.: 947,664

[22] Filed: Sep. 18, 1992

[30] Foreign Application Priority Data

Sep. 19, 1991 [EP] European Pat. Off. ............ 91202416

[51] Int. Cl.$^6$ ............................................. H01J 31/12
[52] U.S. Cl. ...................................... 313/479; 313/478; 428/428; 428/437; 252/510
[58] Field of Search ................. 313/479, 478; 358/250, 358/252, 253; 428/325, 428, 437; 252/500, 502, 510

[56] References Cited

U.S. PATENT DOCUMENTS

| | | | |
|---|---|---|---|
| 4,959,162 | 9/1990 | Armes et al. | 252/519 |
| 5,001,026 | 3/1991 | Bozek et al. | 430/23 |
| 5,030,879 | 7/1991 | Derks | 313/346 R |
| 5,089,357 | 1/1992 | Bolz et al. | 445/3 |

FOREIGN PATENT DOCUMENTS

| | | | |
|---|---|---|---|
| 3834526 | 4/1990 | Germany. | |
| 0179649 | 8/1979 | Japan | 313/479 |
| 1-167254 | 6/1989 | Japan. | |

OTHER PUBLICATIONS

Journal of Non-Crystalline Solids, vol. 136, No. ½ Dec. 1991, pp. 97-102, "Electrically Conducting Glasses: Incorporation of Polypyrrole in a Porous SiO2 Matrix" Mehrotra et al.

*Primary Examiner*—Donald J. Yusko
*Assistant Examiner*—N. D. Patel
*Attorney, Agent, or Firm*—Ernestine C. Bartlett

[57] ABSTRACT

An antistatic coating was provided on a substrate 10 by dispersing latex particles 12 from a polypyrrole compound in an aqueous solution of a hydrolyzed alkoxysilane compound, after which the dispersion was applied to the substrate. The hydrolyzed alkoxysilane compound was converted to silicon dioxide by means of a treatment at an increased temperature, thereby forming a matrix 14 in which the latex particles 12 are dispersed and by means of which the latex particles are adhesively secured to the substrate 10. The antistatic coating can particularly suitably be used on the display screen of a cathode ray tube, and, if desired, said coating can simultaneously be used to reduce the light transmission of the display screen.

9 Claims, 1 Drawing Sheet

ANTISTATIC COATING FOR, IN PARTICULAR, A CATHODE RAY TUBE COMPRISING LATEX PARTICLES OF A POLYPYROLE COMPOUND IN A SILICON DIOXIDE MATRIX

FIELD OF THE INVENTION

The invention relates to an antistatic coating on a substrate, in particular a display screen of a cathode ray tube, which coating comprises an electroconductive polypyrrole compound.

The invention also relates to a method of manufacturing such an antistatic coating.

Antistatic coatings are applied to, for example, display screens of display devices. Such coatings are sufficiently electroconductive to ensure that a high electrostatic voltage present on the outside surface of the device is removed within a few seconds. By virtue thereof, a user touching a screen is not shocked and, additionally the attraction of atmospheric dust is reduced.

BACKGROUND OF THE INVENTION

In German Patent Application DE 3834526, a description is given of the manufacture of transparent, antistatic layers which may consist of, for example, polypyrrole which is provided on a substrate from a colloidal dispersion, after which a thermal treatment is carried out to improve the adhesion.

A disadvantage of this known method is that the layers manufactured are mechanically weak and, for certain applications such as for example display screens, insufficiently resistant to solvents. The colloidal dispersions used have limited stability and must be processed shortly after they have been prepared.

SUMMARY OF THE INVENTION

An object of the invention to provide, inter alia, antistatic coatings comprising polypyrrole compounds, which coatings adhere firmly to the underlying substrate. The coatings must exhibit substantial mechanical durability and scratch resistance and must be resistant to solvents and cleaning agents. In addition, the coatings must be homogeneous, exhibit suitable optical properties and, in particular, be suitable for use on the display screen of display devices. The coatings must be suitable for bringing the light transmission to a desired value. A further object of the invention is to provide a simple method of manufacturing such antistatic coatings, which method must be practicable, in particular, at temperatures at which no damage is done to components of a cathode ray tube. The materials used in the method have to be stable and exhibit long keeping qualities.

These objects are achieved by an antistatic coating on a substrate, in particular the display screen of a cathode ray tube as described in the opening paragraph, which coating is characterized according to the invention in that it comprises latex particles in a matrix of silicon dioxide, which latex particles consist of the polypyrrole compound. If desired, the coating can be supplemented with layers, which are known per se, having an antireflective or antiglare effect or with layers which further increase the scratch resistance.

Polypyrrole, N-substituted polypyrrole and β-substituted polypyrrole can be used as the polypyrrole compound. If desired, polyaniline can alternatively be used. Suitable substituents are: alkyl groups having, for example, up to 5 carbon atoms, aryl groups, alkoxy groups, nitro groups and halogen atoms. Such materials are described in U.S. Pat. No. 4,959,162, inter alia, for use as an antistatic coating. According to a preferred embodiment of the invention, the latex particles consist of unsubstituted polypyrrole.

In view of the optical properties and the uniformity and homogeneity of the layer, it is desirable for the latex particles to have uniform dimensions. The average size of the latex particles preferably ranges from 50 to 150 nm.

To suppress the reflection of light on the rear side of the display screen of a cathode ray tube, it is efficacious to reduce the light transmission of the display screen. Unlike the light originating from the luminescent material of the display tube, the reflected light has to pass twice through the display screen and the layers present thereon. By virtue thereof, a relative improvement can be attained, in particular, if the light output of the luminescent material can be increased by other independent measures. The antistatic coating according to the invention can be efficaciously used to reduce the light transmission of a display screen of a cathode ray tube. By virtue thereof, the necessity of changing the glass composition of the display screen is avoided and the possibilities of bringing the light transmission to substantially any desired value in a simple manner are increased.

The object of providing a method of manufacturing an antistatic coating on a substrate is achieved according to the invention in that latex particles of a polypyrrole compound are dispersed in an aqueous solution of a hydrolyzsed alkoxysilane compound, after which the dispersion is provided on the substrate and the hydrolyzed alkoxysilane compound is converted to silicon dioxide by means of a treatment at an increased temperature. In a preferred embodiment of the method according to the invention, the conversion to silicon dioxide takes place by means of a treatment at a temperature between 150° C. and 170° C. for at least 30 minutes.

An alkoxysilane compound which can suitably be used in the method according to the invention is tetraethyl orthosilicate. Alternatively, other alkoxysilane compounds of the type $Si(OR)_4$, which are known per se, can be used, where R is an alkyl group having, preferably, 1 to 5 carbon atoms.

In Japanese Patent Application (Kokai) JP 1-167254, a description is given of a composite material comprising a matrix of silicon dioxide in which polypyrrole is dispersed. This material is manufactured by impregnating a porous silicon dioxide material, manufactured according to the sol-gel method, with the monomer pyrrole and polymerizing it in situ. However, in this material no latex particles of polypyrrole are used. The composite material is inhomogeneous and, due to its porosity, mechanically weak and it has a rough surface. The porous material is unstable, sensitive to contamination and gives rise to problems during cleaning of the surface.

BRIEF DESCRIPTION OF THE DRAWINGS

The invention will be explained in greater detail by means of exemplary embodiments and with reference to the accompanying drawing, in which.

DETAILED DESCRIPTION OF THE PREFERRED EMBODIMENTS

EXEMPLARY EMBODIMENT 1

Polypyrrole latex particles were prepared by stirring a mixture of 0.014 tool of pyrrole, 0.033 tool of iron (III) nitrate and 0.5 g of polyvinyl alcohol (as the stabilizer) in 100 ml of water for 24 hours. The formation of the polypyrrole particles became apparent from the blackening of the mixture. The particles were separated from the mixture by centrifuging for 1 hour at a speed of rotation of 11000 revolutions per minute, after which the particles were again dispersed in water in a quantity of 1% by weight. Electron microscopy showed that the latex particles have a regular convex shape and that they are monodisperse with an average particle size of 80 nm. Other suitable methods of preparing polypyrrole compounds are described in U.S. Pat. No. 4959162.

A hydrolyzed alkoxysilane compound was prepared by thoroughly stirring for five minutes a mixture of equal quantities by weight of tetraethyl orthosilicate and a 1N solution of hydrochloric acid in water. Ethanol was formed in said hydrolysis, so that the alkoxysilane compound could dissolve.

A quantity of 4% by weight of the solution of the hydrolysed alkoxysilane compound was added to the dispersion with the polypyrrole latex particles. One or more than one layer of said dispersion was spin coated on to a substrate of glass, after which this substrate was maintained at a temperature of 160° C. for 30 minutes, thereby forming a suitably adhering smooth layer of silicon dioxide in which the polypyrrole latex particles were dispersed.

Figure 1:
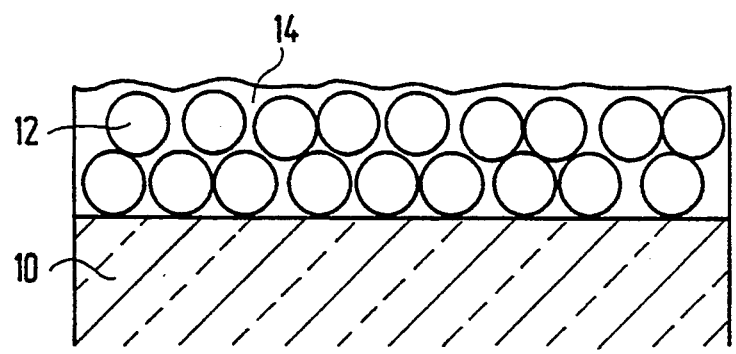
FIG. 1 is a diagrammatic cross-sectional view of an embodiment of a substrate comprising a coating according to the invention.

FIG. 1 diagrammatically shows a substrate 10 of glass carrying a coating which consists of polypyrrole latex particles 12 in a matrix 14 of silicon dioxide. At layer thicknesses of 100 to 200 nm, the surface resistance of the layer is approximately 4 M$\Omega$/□. This is amply sufficient for the desired antistatic effect (a surface resistance between $10^4$ and $10^{10}\Omega$ is desirable) and makes it possible to bring the light-transmission properties to the desired value by changing the layer thickness and the concentration of the dispersion, while preserving the required antistatic effect. The absorption coefficient of the coating was approximately $0.3 \times 10^5$ /cm, resulting in a light transmission between 0.7 and 0.3 at layer thicknesses of 100 to 200 nm.

EXEMPLARY EMBODIMENT 2

Figure 2:
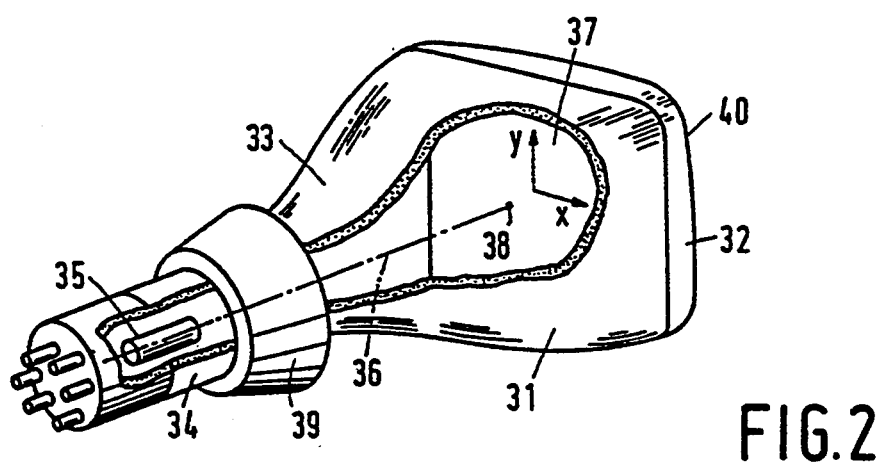
FIG. 2 is a partly cut-away perspective view of an embodiment of a cathode ray tube according to the invention.

FIG. 2 diagrammatically shows a cathode ray tube, which is known per se, comprising a glass envelope 31 having a display window 32, a cone 33 and a neck 34. In the neck there is provided an electron gun 35 for generating an electron beam 36. Said electron beam 36 is focused on a display screen 37 to form a target spot 38. The electron beam 36 is deflected across the display screen 37 in two mutually perpendicular directions x-y by means of the deflection coil system 39. A layer of a luminescent material (phosphor) is present on the display screen 37. The display window 32 is provided on the outside with an antistatic layer 40 which is manufactured as described in exemplary embodiment 1.

By means of the invention, effective antistatic coatings were manufactured and provided on a display screen of a cathode ray tube in a simple manner, said coatings enabling the light-transmission properties to be adjusted according to the requirements.

I claim:

1. An antistatic coating on a substrate, which coating comprises an electroconductive polypyrrole compound, wherein the coating comprises latex particles in a matrix of silicon dioxide, which latex particles consist of the polypyrrole compound.

2. A coating as claimed in claim 1, in which the latex particles consist of unsubstituted polypyrrole.

3. A cathode ray tube comprising a display screen having an antistatic coating as claimed in claim 2.

4. A method for reducing the light transmission of a display screen of a cathode ray tube which comprises the step of applying an antistatic coating as claimed in claim 2 on said display screen.

5. A coating as claimed in claim 1, in which the average size of the latex particles ranges from 50 to 150 nm.

6. A cathode ray tube comprising a display screen having an antistatic coating as claimed in claim 5.

7. A method for reducing the light transmission of a display screen of a cathode ray tube which comprises the step of applying an antistatic coating as claimed in claim 5 on said display screen.

8. A cathode ray tube comprising a display screen having an antistatic coating as claimed in claim 1.

9. A method for reducing the light transmission of a display screen of a cathode ray tube which comprises the step of applying an antistatic coating as claimed in claim 1 on said display screen.

* * * * *